United States Patent
Mizuno et al.

(10) Patent No.: US 8,717,507 B2
(45) Date of Patent: *May 6, 2014

(54) METHOD OF MANUFACTURING A DISPLAY APPARATUS BY BONDING TOGETHER A PAIR OF SUBSTRATES WITH A FIRST SEALING MEMBER, ON THE OUTER PERIPHERY OF WHICH IS ARRANGED AN ALKYLSILOXANE COMPOUND IRRADIATED WITH ULTRAVIOLET RADIATION

(75) Inventors: Hiroshi Mizuno, Zama (JP); Kiyofumi Sakaguchi, Miura-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

This patent is subject to a terminal disclaimer.

(21) Appl. No.: 13/005,169

(22) Filed: Jan. 12, 2011

(65) Prior Publication Data

US 2011/0102728 A1  May 5, 2011

Related U.S. Application Data

(63) Continuation of application No. 12/326,439, filed on Dec. 2, 2008, now Pat. No. 7,894,004.

(30) Foreign Application Priority Data

Dec. 11, 2007  (JP) ................................ 2007-319706

(51) Int. Cl.
*G02F 1/335* (2006.01)

(52) U.S. Cl.
USPC ........................ 349/5; 349/153; 257/E51.008

(58) Field of Classification Search
USPC .......... 349/42, 46, 146, 153, 5; 257/E51.008, 257/E21.7
See application file for complete search history.

(56) References Cited

U.S. PATENT DOCUMENTS

| | | | |
|---|---|---|---|
| 4,640,583 | A | 2/1987 | Hoshikawa et al. |
| 5,458,804 | A | 10/1995 | Yamada et al. |
| 5,612,802 | A | 3/1997 | Okada et al. |
| 5,629,788 | A | 5/1997 | Mori et al. |
| 5,657,141 | A | 8/1997 | Terada et al. |
| 5,661,532 | A | 8/1997 | Okada et al. |
| 5,709,818 | A | 1/1998 | Yamashita et al. |
| 5,710,433 | A | 1/1998 | Yamashita et al. |
| 5,728,318 | A | 3/1998 | Yamashita et al. |

(Continued)

FOREIGN PATENT DOCUMENTS

| | | |
|---|---|---|
| JP | 60-026321 | 2/1985 |
| JP | 62-058221 | 3/1987 |

(Continued)

*Primary Examiner* — Akm Enayet Ullah
(74) *Attorney, Agent, or Firm* — Fitzpatrick, Cella, Harper & Scinto

(57) ABSTRACT

A highly moisture-resistant liquid crystal display apparatus and a manufacturing method thereof suppresses display deterioration due to the occurrence of image retention without gap controllability and alignment-stability maintenance. The liquid crystal display apparatus includes: a first sealing member arranged at an outer periphery of a liquid crystal layer sandwiched between a pair of substrates; and a second sealing member arranged at an outer periphery of the first sealing member in contact with the pair of substrates. The second sealing member 16 is formed from an alkylsiloxane compound as a main ingredient which is formed into an inorganic film by irradiation with an ultraviolet radiation. The alkylsiloxane compound is a di-alkylsiloxane compound or di-methyl-siloxane compound.

11 Claims, 2 Drawing Sheets

(56) References Cited

U.S. PATENT DOCUMENTS

| | | |
|---|---|---|
| 5,733,475 A | 3/1998 | Yamashita et al. |
| 5,785,890 A | 7/1998 | Yamashita et al. |
| 5,805,129 A | 9/1998 | Inaba et al. |
| 6,175,397 B1 | 1/2001 | Inoue et al. |
| 6,313,894 B1 | 11/2001 | Sekine et al. |
| 6,476,887 B1 | 11/2002 | Sekine et al. |
| 7,183,211 B2 * | 2/2007 | Konno et al. ............... 438/691 |
| 7,712,676 B2 | 5/2010 | Yukawa et al. |
| 7,864,272 B2 * | 1/2011 | Sakaguchi ................ 349/113 |
| 7,894,004 B2 * | 2/2011 | Mizuno et al. ................ 349/5 |
| 2008/0121725 A1 | 5/2008 | Nomura |
| 2008/0128517 A1 | 6/2008 | Yukawa et al. |
| 2008/0136990 A1 * | 6/2008 | Kimura ........................ 349/46 |
| 2008/0203904 A1 * | 8/2008 | Kim et al. ................... 313/504 |
| 2009/0122209 A1 | 5/2009 | Sakaguchi |
| 2009/0147205 A1 | 6/2009 | Mizuno et al. |

FOREIGN PATENT DOCUMENTS

| | | |
|---|---|---|
| JP | 2004-189942 A | 7/2004 |
| JP | 2004-333986 A | 11/2004 |
| JP | 2005-070245 A | 3/2005 |
| JP | 2007-003671 A | 1/2007 |

* cited by examiner

METHOD OF MANUFACTURING A DISPLAY APPARATUS BY BONDING TOGETHER A PAIR OF SUBSTRATES WITH A FIRST SEALING MEMBER, ON THE OUTER PERIPHERY OF WHICH IS ARRANGED AN ALKYLSILOXANE COMPOUND IRRADIATED WITH ULTRAVIOLET RADIATION

CROSS REFERENCE TO RELATED APPLICATION

This application is a continuation of application Ser. No. 12/326,439, filed Dec. 2, 2008, now U.S. Pat. No. 7,894,004 issued on Feb. 22, 2011.

BACKGROUND OF THE INVENTION

1. Field of the Invention

The present invention relates to a liquid crystal display apparatus, a manufacturing method thereof, and a liquid crystal projector using the liquid crystal display apparatus.

2. Description of the Related Art

In recent years, projection type image display apparatuses of the type using a reflection-type liquid crystal display called "LCOS (Liquid Crystal on Silicon) display" in the art of liquid crystal displays have been widespread. Such a projection-type image display apparatus is capable of displaying images that are smoother and have higher-definition and higher color reproducibility than projection-type image display apparatuses of the type using a transmission-type liquid crystal display.

Such liquid crystal displays as reflection-type liquid crystal displays of the LCOS type, in general, have a structure in which a liquid crystal member is held by peripheral sealing formed at a peripheral portion of the display and end sealing. A resin-sealing adhesive is typically used for both the peripheral sealing and the end sealing.

Such a resin-sealing adhesive calls for an essentially required property of preventing the liquid crystal member from leaking out of the liquid crystal display, as well as many other properties. Specifically, such properties include a property of failing to affect control of the gap between opposing substrates, a property of maintaining electro-optic characteristics of the liquid crystal display under a high-temperature and high-humidity environment, and a property of stabilizing liquid crystal alignment. Actually, however, a common resin-sealing adhesive used in the liquid-crystal-display manufacturing stage cannot completely prevent penetration of moisture under a high-temperature and high-humidity environment. Therefore, liquid crystal displays involve a problem with maintenance of the electro-optic characteristics under a high-temperature and high-humidity environment.

A reflection-type liquid crystal display of the LCOS type, in particular, has a transparent ITO electrode and a metal pixel electrode as opposing electrodes and, hence, the work functions of the two electrode materials are not equal to each other. Such an electrode configuration is called a variety-electrode configuration. With the variety-electrode configuration, it is conventionally known that positive ions and negative ions contained in the liquid crystal member are likely to become out of balance when a very small amount of moisture is mixed into the liquid crystal member.

Such imbalance of ions in the liquid crystal member leads to image retention. For this reason, preventing penetration of moisture is an important challenge for such a reflection-type liquid crystal display of the LCOS type in order to prevent image retention also.

Many techniques have been proposed to solve to the problem of moisture penetration into a liquid crystal display. For example, Japanese Patent Application Laid-Open No. S60-026321 has proposed a technique of forming a resin structure at a peripheral portion of a liquid crystal display.

Specifically, the technique described therein includes providing a double-structure sealing portion in which a low-water permeability resin (for example an epoxy adhesive) is used for a first sealing in contact with a liquid crystal layer, while a resin having a strong adhesion to a flexible substrate (for example a silicone adhesive) is used for an outer second sealing. Alternatively, the technique described therein includes providing a double-structure sealing portion in which a resin that has difficulty reacting with a liquid crystal (for example a silicone adhesive) is used for the first sealing in contact with the liquid crystal layer, while a low-water permeability resin (for example an epoxy adhesive) is used for the outer second sealing.

Japanese Patent Application Laid-Open No. S62-058221 has proposed a technique of depositing a metal oxide formed from an organic metal compound as a raw material over a moisture-penetration passage in order to improve the moisture resistance of a display apparatus under a high-temperature and high-humidity environment by leaps and bounds.

SUMMARY OF THE INVENTION

In cases where the technique described in Japanese Patent Application Laid-Open No. S60-026321 is used, the water permeability of the resin structure cannot ensure a sufficient moisture resistance. Therefore, the technique does not reach the essential solution of bringing about a life prolonging effect under a high-temperature and high-humidity environment. When an attempt is made to obtain a sufficient moisture resistance by the provision of the resin structure, a portion of the resin structure which is formed at the peripheral portion of the liquid crystal display becomes thick and bulky, resulting in the entire liquid crystal display having a large structure. Such an arrangement is considerably disadvantageous to projection-type image display apparatuses calling for downsizing in particular.

There is also an attempt to improve the moisture resistance remarkably by utilizing a dense thin film of silicon oxide or silicon nitride which functions as a moisture-resistant film having a high moisture-barrier property, as in Japanese Patent Application Laid-Open No. S62-058221. However, during the process of converting the organic metal compound deposited on the liquid crystal display to an inorganic substance by eliminating an organic functional group from the organic metal compound, a resin-sealing adhesive used for the peripheral sealing and the end sealing is subjected to a temperature higher than the glass transition temperature thereof.

Such an elevated temperature causes the resin-sealing adhesive to melt, thus varying the dimensions of the resin-sealing adhesive. For this reason, neither a desired cell gap, nor a sufficient sealing effect against the liquid crystal member can be obtained. Further, the resin forming the adhesive may be thermally decomposed to produce impurities, which increase the likelihood of display deterioration due to image retention.

The projection-type image display apparatuses, particularly the projection-type image display apparatuses of the type using a reflection-type liquid crystal display cannot obtain a good display quality because an uneven cell gap of the liquid crystal display is emphasized by a magnifying-projection system. Also, the display-quality deterioration due to image retention caused by impurity ions is a more serious problem with the projection-type image display apparatuses which apply intensive light to the respective liquid crystal displays over a prolonged time than with direct-view type liquid crystal display apparatuses.

An object of the present invention is to provide a highly moisture-resistant liquid crystal display apparatus which is capable of suppressing display deterioration due to the occurrence of image retention without impairing properties including gap controllability and alignment-stability maintenance, as well as a manufacturing method thereof. Another object of the present invention is to provide a liquid crystal projector which is capable of realizing good display quality and high reliability.

A liquid crystal display apparatus according to the present invention includes: a first sealing member arranged at an outer periphery of a liquid crystal layer sandwiched between a pair of substrates; and a second sealing member arranged at an outer periphery of the first sealing member in contact with the pair of substrates, wherein the second sealing member is formed from an alkylsiloxane compound as a main ingredient which is formed into an inorganic film by irradiation with ultraviolet radiation.

A method of manufacturing a liquid crystal display apparatus according to the present invention includes: a first step of injecting a liquid crystal into a space defined by a pair of substrates and a first sealing member bonding together the pair of substrates to form a first structure; and a second step of forming an alkylsiloxane compound at an outer periphery of the first sealing member in contact with the pair of substrates, and irradiating the alkylsiloxane compound with an ultraviolet radiation to form a second structure having an inorganic film.

According to the present invention, a highly moisture-resistant liquid crystal display apparatus can be provided which is capable of suppressing display deterioration due to the occurrence of image retention without impairing properties required of a resin-sealing adhesive, including gap controllability and alignment-stability maintenance.

Further features of the present invention will become apparent from the following description of exemplary embodiments with reference to the attached drawings.

DESCRIPTION OF THE EMBODIMENTS

Figure 1:
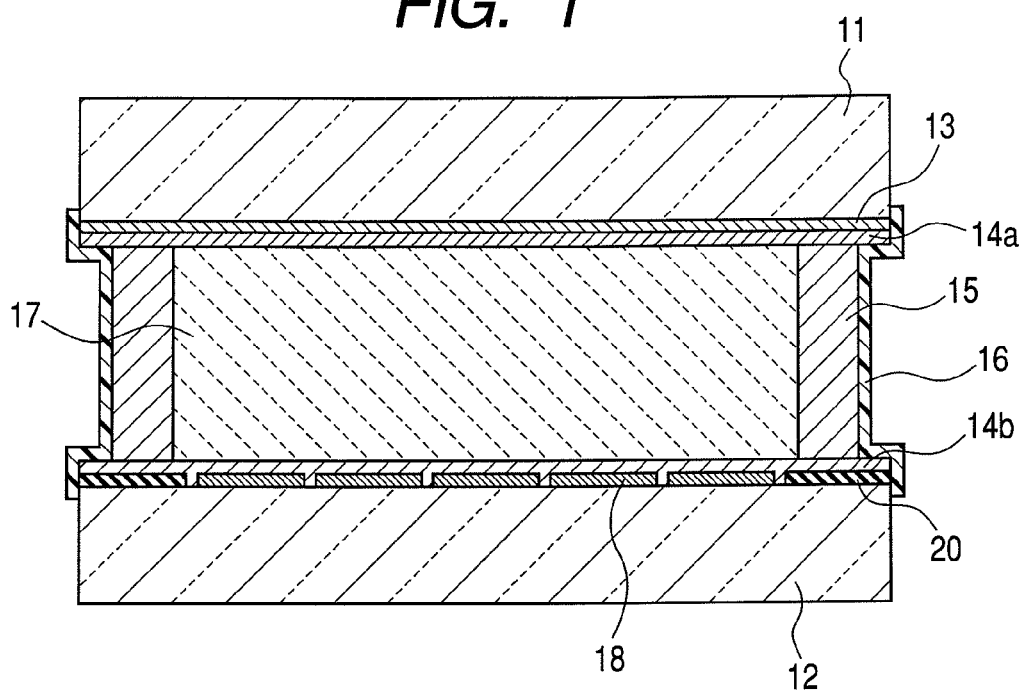
FIG. 1 is a schematic sectional view illustrating one exemplary embodiment of a reflection-type liquid crystal display apparatus according to the present invention.
Figure 2:
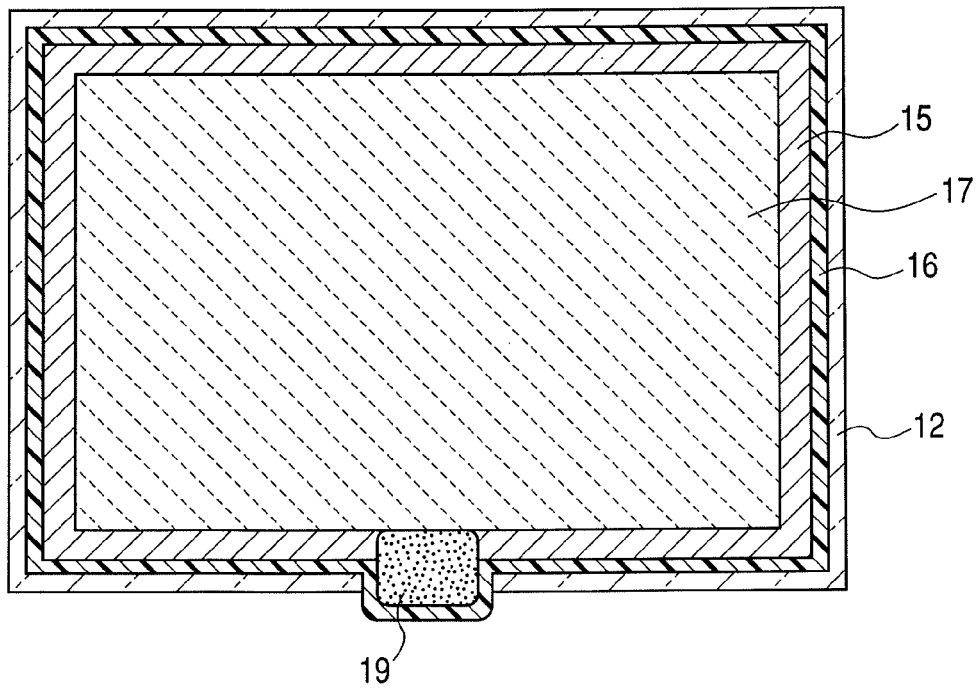
FIG. 2 is a schematic plan view of the reflection-type liquid crystal display apparatus illustrated in FIG. 1.

Hereinafter, exemplary embodiments for carrying out the present invention will be described in detail with reference to the drawings. FIG. 1 is a schematic sectional view illustrating a reflection-type liquid crystal display apparatus of the LCOS type according to the present invention, and FIG. 2 is a schematic plan view of the reflection-type liquid crystal display apparatus.

The liquid crystal display apparatus shown includes: a translucent substrate 11 including a glass substrate having a transparent electrode; and a single crystal semiconductor substrate (single crystal silicon substrate or the like) 12 having an effective pixel region in which pixels each having a switching element and a reflective electrode are arranged in a two-dimensional array. The effective pixel region extends inwardly of a first sealing member 15. The translucent substrate 11 and the single crystal semiconductor substrate 12 are a pair of substrates sandwiching a liquid crystal layer 17 therebetween.

The liquid crystal display apparatus also includes a transparent electrode 13, a reflective pixel electrode 18, and alignment films (i.e., alignment control films) 14a and 14b. The pair of substrates including the translucent substrate 11 and the single crystal semiconductor substrate 12 have, at opposing surfaces thereof, the alignment films respectively. The alignment films 14a and 14b are each an oblique vapor-deposition film formed by oblique vapor deposition of an inorganic material such as silicon oxide, or a like film.

A resin-sealing layer (i.e., peripheral sealing) 15 is the first sealing member, and an inorganic film 16, which is the second sealing member arranged at an outer periphery of the first sealing member 15, is formed from an alkylsiloxane compound as a main ingredient. As illustrated in FIG. 1, the first sealing member 15 is arranged at an outer periphery of the liquid crystal layer 17 sandwiched between the pair of substrates.

The second sealing member 16 is arranged at an outer periphery of the first sealing member 15. The second sealing member 16 is formed from an alkylsiloxane compound as a main ingredient which is formed into an inorganic film by irradiation with an ultraviolet radiation.

This inorganic film is arranged in contact with at least one of the translucent substrate 11 and the single crystal semiconductor substrate 12 or with at least one of the alignment films 14a and 14b formed over the opposing surfaces, respectively, of the pair of substrates 11 and 12. (The inorganic film is arranged in contact with at least one of the translucent substrate 11 and the alignment film 14a and with at least one of the single crystal semiconductor substrate 12 and the alignment film 14b.) The organic film can be arranged in contact with the alignment films 14a and 14b both.

A sealing member 19 illustrated in FIG. 2 is a member for sealing an injection region opened at the first sealing member 15 for injection of the liquid crystal layer 17. A dummy electrode 20 is illustrated in FIG. 1.

Examples of alkylsiloxane compounds include silicone materials such as a di-alkylsiloxane compound and a di-methyl-siloxane compound. Specifically, such an alkylsiloxane compound is a compound at a state of an alkylsiloxane structure at a temperature equal to or lower than glass transition temperature of the first sealing member 15 (for example, di-methyl-silicone oil or di-methyl-silicone gas). As described above, the alkylsiloxane compound is formed into silicon oxide by irradiation with ultraviolet irradiation.

In cases where silicon oxide is used for the alignment films, the alignment films and the second sealing member 16 are formed from the same material and, hence, the adhesion therebetween is enhanced to enable the moisture resistance of the liquid crystal display apparatus to be further improved. Because the oblique vapor deposition film, in particular, is formed so as to fill up gaps between needle-like structures of silicon oxide, the adhesion is particularly enhanced to enable the moisture resistance to be further improved. Thus, the oblique vapor deposition film is desirable. In this case, the alignment film formed over at least one of the pair of substrates 11 and 12 can be arranged in contact with the inorganic film, and the alignment film and the inorganic film can be formed from the same material.

As the translucent substrate 11, a substrate which transmits visible rays of light therethrough, such as a glass substrate or a quartz substrate for use in a liquid crystal device, is used. The surface of the translucent substrate 11 which opposes the single crystal semiconductor substrate 12 is formed with the transparent electrode 13 formed from a transparent conductive material such as $SnO_2$ or ITO (indium tin oxide).

The transparent electrode 13 formed at the translucent substrate 11 may be configured to prevent reflection at the interface with the liquid crystal member by being combined with a silicon oxide thin film, an aluminum oxide thin film or the like. Alternatively, a reflection-preventive film including a multilayered inorganic dielectric film or the like may be formed over a surface of the translucent substrate 11 which is opposite away from the surface formed with the transparent electrode 13.

The single crystal semiconductor substrate 12 is formed with the reflective pixel electrode (i.e., a pixel electrode having a light reflective property) 18. The reflective surface of the reflective pixel electrode 18 is formed from aluminum, silver or an alloy thereof. Though aluminum is used for the reflective surface, there is no particular limitation on the material used for the reflective layer. The thicknesses of both the translucent substrate 11 and the single crystal semiconductor substrate 12 are not particularly limited.

The alignment films 14a and 14b are formed at the interface between the translucent substrate 11 and the liquid crystal member 17 and the interface between the single crystal semiconductor substrate 12 and the liquid crystal member 17, respectively. One of an oblique vapor-deposition film of an inorganic dielectric material, such as silicon oxide, and a polyimide film treated by rubbing can be used for the alignment films 14a and 14b. There is no particular limitation on the alignment films. In the present embodiment, the alignment property (alignment direction) imparted by the alignment films 14a and 14b to the liquid crystal is such as to orient liquid crystal molecules in antiparallel directions between the translucent substrate 11 and the single crystal semiconductor substrate 12.

The spacing (cell gap) d between the translucent substrate 11 and the single crystal semiconductor substrate 12 is optimized by the product of the refractive index anisotropy $\Delta n$ of an nematic liquid crystal with negative dielectric anisotropy by the spacing d between the two substrates, i.e., the value of $\Delta n \cdot d$. The substrates are bonded together by the resin sealing layer 15 serving as the first sealing member so that the spacing d takes on a desired value. Thereafter, the liquid crystal is sandwiched between the substrates to form a liquid crystal cell. The spacing d between the pair of substrates 11 and 12 can be about 1.5 to about 5.0 µm. In the present embodiment and comparative examples to be described later, the spacing d is set to 3.0 µm.

For a desired cell gap to be obtained, a resin adhesive to be used for sealing is mixed with a spacer material and then the substrates each having a high flatness are bonded together with the resin adhesive. Thus, a cell having the desired cell gap is formed. In the present embodiment, a reflection-type cell is manufactured using 0.7 mm-thick glass plates formed with ITO for use with a liquid crystal (1737: a product of Corning Incorporated), a spacer material having a spacer diameter of 3.0 µm (SW-3.0: a product of Catalysts and Chemicals Industries Co., Ltd.), and an ultraviolet-thermal curable adhesive (WR-798: a product of Kyoritsu Chemical & Co., Ltd.). The cell gap of the reflection-type cell thus manufactured is an even gap with less non-uniformity. After injection of the liquid crystal into the cell, the injection hole is sealed with an ultraviolet curing-resin sealing adhesive as illustrated in FIG. 2, thus forming a reflection-type liquid crystal display of the LCOS type.

A liquid crystal material used for the liquid crystal layer 17 can be a common nematic liquid crystal with negative dielectric anisotropy. In the present embodiment, MLC-6608 (a product of Merck & Co., Inc.) is used as the liquid crystal material and injected into the aforementioned cell under reduced pressure, to form the reflection-type liquid crystal cell. The ultraviolet curable adhesive used for end sealing is 3026B (a product of ThreeBond Co., Ltd.). The liquid crystal member injected is completely sealed with the ultraviolet curable adhesive to form the reflection-type liquid crystal display of the LCOS type.

A main ingredient of the inorganic film 16 can be di-methyl-silicone oil or the like, as described above. A thin coat of such a material is applied to an outer periphery of the resin-sealing adhesive used for the peripheral sealing portion and the end-sealing portion and then formed into the inorganic film by irradiation with ultraviolet irradiation. The ultraviolet irradiation with which the di-methyl-silicone oil is irradiated depends on the molecular weight or the viscosity of the di-methyl-silicone oil.

The display area can be covered with an ultraviolet shielding mask in order to suppress damage to the liquid crystal material caused by the ultraviolet radiation. The di-methyl-silicone oil can be irradiated with the ultraviolet radiation, with the reflection-type liquid crystal display being heated at a temperature equal to or lower than the glass transition temperature of the resin-sealing adhesive used for the peripheral sealing and the end sealing. By raising the temperature of the reflection-type liquid crystal display, the di-methyl-silicone oil can be irradiated with a reduced amount of energy of the ultraviolet radiation.

Structural materials for use in the above-described, reflection-type cell, such as the substrates, liquid crystal member and resin-sealing adhesive, are not particularly limited to those described in the present description as long as these materials exercise like functions as the structural materials described.

After the injection-hole portion has been sealed with the ultraviolet curable adhesive cured by UV irradiation, the liquid crystal display is entirely subjected to a thermal treatment at a temperature lower than the phase transition temperature of the liquid crystal. The thermal treatment can effectively remove moisture contained in or adsorbed to the liquid crystal, the inside and the surface of the sealing material, and the inside and the surface of the end-sealing material. Therefore, the frequency of failures due to inclusion of moisture can be reduced in an initial state of the liquid crystal display apparatus.

A specific method of manufacturing the liquid crystal display apparatus according to the present invention is described below. The manufacturing process for the liquid crystal display apparatus according to the present invention includes a first step and a second step as described below. A third step and a fourth step may be performed.

(1) The translucent substrate 11 and the single crystal semiconductor substrate 12 are bonded together with the first sealing member 15 containing the spacer in such a manner that the transparent electrode 13 and the reflective electrode 14 oppose each other.

(2) The liquid crystal is injected into the space defined by the pair of substrates 11 and 12 and the first sealing member 15 from the injection region formed at the first sealing member 15 to form the liquid crystal layer 17.

(3) After the injection of the liquid crystal, the injection region is sealed with the sealing member 19 to form a first structure (i.e., liquid crystal cell) in which the liquid crystal is sandwiched between the pair of substrates.

The first step includes the above-described operations (1) to (3).

(4) After the sealing with the sealing member 19, the alkylsiloxane compound is formed by coating or a like process at an outer periphery of the first sealing member 15 and at an outer periphery of the sealing member 19 in contact with the outer peripheral surfaces thereof. Alternatively, the alkylsiloxane compound is formed by coating or a like process in contact with at least one of the translucent substrate 11 and the alignment film 14a and at least one of the single crystal semiconductor substrate 12 and the alignment film 14b.

(5) The alkylsiloxane compound is irradiated with the ultraviolet radiation to form the second sealing member 16 including a silicon oxide film as an inorganic film, thus forming a second structure (i.e., liquid crystal display).

The second step includes the above-described operations (4) and (5).

The third step of thermally treating the first structure at a temperature lower than a phase transition temperature from a liquid crystal phase to a liquid phase of the liquid crystal, may be inserted between the first and second steps. Further, the fourth step of thermally treating the second structure at a temperature lower than the phase transition temperature from the liquid crystal phase to the liquid phase of the liquid crystal, may be performed after the second step.

By thus performing the first and second steps optionally with the third step and/or the fourth step, a highly moisture-resistant liquid crystal display apparatus can be manufactured which is capable of suppressing display deterioration due to the occurrence of image retention.

Figure 3:
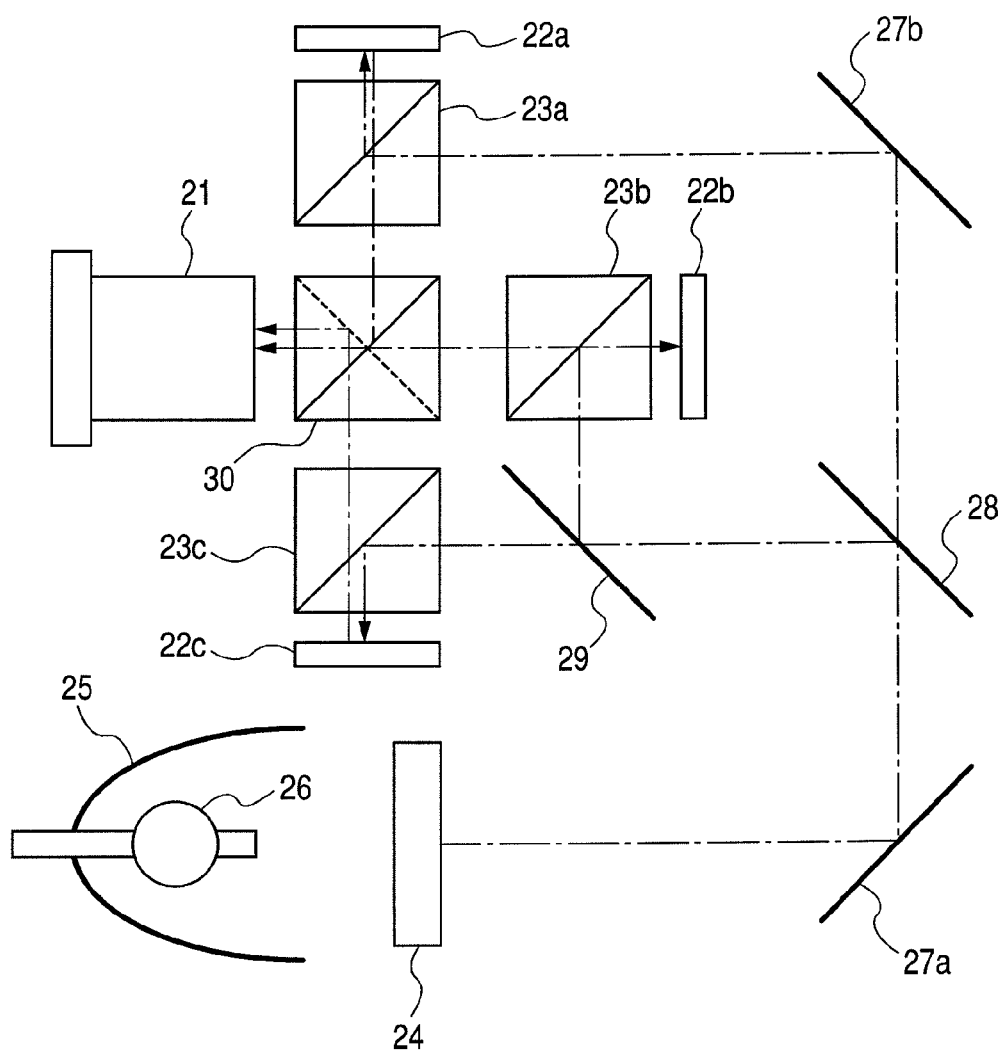
FIG. 3 is a schematic view illustrating one exemplary embodiment of a liquid crystal projector according to the present invention.

A liquid crystal projector (i.e., projection-type image display apparatus) using the liquid crystal display apparatus of the present invention is described below. FIG. 3 is a view schematically illustrating one exemplary embodiment of a liquid crystal projector according to the present invention.

The liquid crystal projector of the present invention has a plurality of liquid crystal display apparatuses according to the present invention. The liquid crystal projector of the present invention is a projection-type display including a light source for applying light to the reflection-type liquid crystal displays, and a unit for displaying an image by superimposing rays of light from the plurality of reflection-type liquid crystal displays one upon another.

The liquid crystal projector shown includes a projection lens 21 for projecting an image onto a screen, liquid crystal displays (i.e., reflection type liquid crystal display apparatuses) 22a to 22c according to the present invention, and a polarization beam splitters 23a to 23c each configured to allow S-polarized light to pass therethrough and reflect P-polarized light for example. The liquid crystal projector also includes an integrator 24 configured to gather light from the light source, an elliptic reflector 25, an arc lamp 26 using a metal halide, UHP or the like, and high-reflectance mirrors 27a and 27b. The liquid crystal projector further includes a G/R light reflection dichroic mirror 28, a G light reflection dichroic mirror 29, and a color composing prism 30 configured to recompose all mono-color lights separated by the dichroic mirrors.

The image display mechanism of the liquid crystal projector is described below following the process of travel of a light beam. First, the lamp 26 of the light source emits white light, which is then gathered by the elliptic reflector 25 at an entrance of the integrator 24 located forwardly of the reflector 25, so that the spatial intensity distribution of the light beam is uniformalized. The light beam outgoing from the integrator 24 is reflected at a right angle by the high-reflectance mirror 27a and reaches the G/R light reflection dichroic mirror 28.

The G/R light reflection dichroic mirror 28 reflects G/R light toward the G light reflection dichroic mirror 29. The G light reflection dichroic mirror 29 reflects G light, which is then polarized by passing through the polarization beam splitter 23b to illuminate the reflection-type liquid crystal display 22b. R light passes through the G light reflection dichroic mirror 29, travels toward the polarization beam splitter 23c and is then polarized by passing through the polarization beam splitter 23c to illuminate the reflection-type liquid crystal display 22c. On the other hand, B light passes through the G/R light reflection dichroic mirror 28 and is then reflected at a right angle by the high-reflectance mirror 27b. B light thus reflected is polarized by passing through the polarization beam splitter 23a to illuminate the reflection-type liquid crystal display 22a.

R light, G light and B light are reflected and polarization-modulated by the reflection type liquid crystal displays 22a to 22c, respectively, and then pass through the polarization beam splitters 23a to 23c, respectively. The light beams having passed through the polarization beam splitters 23a to 23c are turned into image light again by the color composing prism 30, and this image light is then magnified and projected onto an unillustrated screen by passing through the projection lens 21.

The moisture resistance of a reflection-type liquid crystal display is evaluated by quantization of the moisture content of the reflection-type liquid crystal display having been subjected to a high-temperature and high-humidity environment test and conducting an image-retention test. The high-temperature and high-humidity test is conducted by exposing the reflection-type liquid crystal display to an environment at a temperature of 60° C. and a humidity of 90% RH for 300 hours. The moisture content of the reflection-type liquid crystal display can be determined by a process including heating the reflection-type liquid crystal display that was crashed to vaporize moisture contained therein and measuring the percentage of moisture content of the display using a Karl-Fischer titration apparatus. The image retention of the reflection-type liquid crystal display is evaluated by visually checking the presence or absence of an after image of a predetermined fixed pattern when a uniform display is shown throughout the screen after the fixed pattern has been displayed in the display area for a fixed time period.

Exemplary Embodiments

Exemplary embodiments of the present invention are described below.

Exemplary Embodiment 1

In exemplary embodiment 1, a liquid crystal display (i.e., liquid crystal display apparatus) was manufactured by performing the first and second steps of the above-described manufacturing method according to the present invention. Initially, the first step was performed to form the first structure (i.e., liquid crystal cell) as described above. In the first step, as described above, a process including forming the liquid crystal layer 17 by injecting the liquid crystal into the space defined by the pair of substrates 11 and 12 and the first sealing member 15, was performed.

Subsequently, the second step was performed to form the second structure (i.e., liquid crystal display) as described above. Specifically, TSF-458-100 (a product of GE Toshiba Silicones Co.) was used as the di-methyl-silicone oil serving as a main ingredient of the inorganic film 16. A thin coat of the di-methyl-silicone oil was applied to an outer periphery of the resin sealing adhesive used for peripheral sealing and end sealing. Thereafter, an inorganic thin film was formed by irradiation with an ultraviolet irradiation at 5,000 mJ/cm$^2$ in an ordinary temperature environment, to form the second structure (i.e., liquid crystal display). The display area was covered with an ultraviolet shielding mask in order to suppress damage to the liquid crystal material caused by the ultraviolet radiation.

Exemplary Embodiment 2

In exemplary embodiment 2, a liquid crystal display (i.e., liquid crystal display apparatus) was manufactured by performing the first and second steps as in exemplary embodiment 1. Initially, in the first step, the liquid crystal was injected into the space defined by the pair of substrates and the first sealing member to form the first structure, as in exemplary embodiment 1. In the second step, KF96-100cs (a product of Shin-Etsu Chemical Co., Ltd.) was used as the di-methyl-silicone oil serving as the main ingredient of the inorganic film 16, and a thin coat of the di-methyl-silicone oil was applied to an outer periphery of the resin sealing adhesive used in the peripheral sealing portion and the end-sealing portion.

Thereafter, an inorganic thin film was formed by irradiation with ultraviolet irradiation at 5,000 mJ/cm$^2$ in an ordinary temperature environment, to form the second structure. The display area was covered with an ultraviolet shielding mask in order to suppress damage to the liquid crystal material caused by the ultraviolet radiation.

Exemplary Embodiment 3

In exemplary embodiment 3, the third step of thermally treating the above-described first structure at a temperature lower than the phase transition temperature from a liquid crystal phase to a liquid phase of the liquid crystal, was inserted between the first and second steps. In the present embodiment, the thermal treatment was conducted at 80° C. for 240 hours.

Before providing the second sealing member 16 of high moisture durability, subjected to the thermal treatment are moisture and impurities present in the liquid crystal layer 17 and at the surfaces of the alignment films 14a and 14b as well as moisture and impurities of the first sealing member 15. The heating treatment turns the condition of the inside of the liquid crystal cell into a reduced moisture and impurity condition. Thereafter, the liquid crystal display was sealed with the second sealing member 16 having a high moisture resistance to enable the inside of the liquid crystal cell to keep the reduced moisture and impurity condition. A liquid crystal display was manufactured by performing the above-described first and second steps as in exemplary embodiment 1 except that the third step was performed.

The reflection-type liquid crystal displays manufactured in exemplary embodiments 1 to 3 were subjected to the high-temperature and high-humidity environment test and then evaluated for yields thereof by projecting an image displayed by each liquid crystal display using a liquid crystal projector. The liquid crystal projector using the reflection-type liquid crystal display of exemplary embodiment 3 was evaluated to ensure a higher yield than the liquid crystal projectors using the reflection-type liquid crystal displays of exemplary embodiments 1 and 2.

Exemplary embodiment 3 is particularly effective when the liquid-crystal-panel assembly process has low cleanness and stability. Since the treatment time depends on the degree of cleanness and the degree of stability of the liquid-crystal-panel assembly process, in some cases the yield is improved even when the treatment time is relatively short and further treatment time is not necessary.

When the liquid-crystal-panel assembly process has low cleanness and stability, some reflection-type liquid crystal displays cause non-uniformity of display picture to occur in a projected image even just after the manufacture thereof. However, the thermal treatment according to the present embodiment can eliminate such non-uniformity of display picture while improving the yield.

Exemplary Embodiment 4

In exemplary embodiment 4, in addition to the process of exemplary embodiment 3, the fourth step of thermally treating the above-described second structure at a temperature lower than the phase transition temperature from the liquid crystal phase to the liquid phase of the liquid crystal, was performed after the above-described second step. In the present embodiment, the thermal treatment was conducted at 80° C. for 240 hours. A liquid crystal display was manufactured by performing the process described in exemplary embodiment 3 except that the fourth step was performed.

The reflection-type liquid crystal displays manufactured in exemplary embodiments 1, 2 and 4 were subjected to the high-temperature and high-humidity environment test and then evaluated for yields thereof by projecting an image displayed by each liquid crystal display using a liquid crystal projector. The liquid crystal projector using the reflection-type liquid crystal display of exemplary embodiment 4 was evaluated to ensure a higher yield than the liquid crystal projectors using the reflection-type liquid crystal displays of exemplary embodiments 1 and 2.

Exemplary embodiment 4 is particularly effective when the liquid-crystal-panel assembly process has low cleanness and stability. Since the treatment time depends on the degree of cleanness and the degree of stability of the liquid-crystal-panel assembly process, in some cases the yield is improved even when the treatment time is relatively short and further treatment time is not necessary.

When the liquid-crystal-panel assembly process has low cleanness and stability, some reflection-type liquid crystal displays cause in-plane display unevenness in a projected image even just after the manufacture thereof. However, the thermal treatment according to the present embodiment can eliminate such in-plane display unevenness while improving the yield.

In the present embodiment, the fourth step was performed in addition to the process of exemplary embodiment 3. However, when the cleanness and stability of the liquid-crystal-panel assembly process are low, only the fourth step may be additionally performed without the third step described in exemplary embodiment 3 to bring about a satisfactory effect.

COMPARATIVE EXAMPLE 1

In comparative example 1, a reflection-type liquid crystal display was manufactured in which a thin coat of TSF-458-100 (a product of GE Toshiba Silicones Co.) was merely applied to an outer periphery of the resin sealing adhesive used in the peripheral sealing portion and the end-sealing portion in the liquid crystal display.

COMPARATIVE EXAMPLE 2

In comparative example 2, a reflection-type liquid crystal display was manufactured with no treatment on the outer periphery of the peripheral sealing portion and end-sealing portion.

COMPARATIVE EXAMPLE 3

In comparative example 3, a reflection-type liquid crystal display was manufactured in which an inorganic substance formed into aerosol was deposited over an outer periphery of the resin sealing adhesive used in the peripheral sealing portion and the end-sealing portion in the liquid crystal display. In the process of depositing and stabilizing the aerosol of the inorganic substance at the outer periphery of the resin sealing adhesive used in the peripheral sealing portion and the end-sealing portion in the liquid crystal display, sintering at 250° C. was performed.

The reflection-type liquid crystal displays manufactured in exemplary embodiments 1 to 4 and comparative examples 1 to 3 were subjected to the high-temperature and high-humidity environment test and then measured for moisture contents thereof. Also, the reflection-type liquid crystal displays manufactured in exemplary embodiments 1 to 4 and comparative examples 1 to 3 were subjected to the high-temperature and high-humidity environment test and then evaluated for image retention by projecting an image displayed by each liquid crystal display using a liquid crystal projector.

The moisture content determined from the percentage of moisture content of each of the reflection-type liquid crystal displays of exemplary embodiments 1 to 4 having been subjected to the high-temperature and high-humidity environment test was lower than the moisture content of any one of the reflection-type liquid crystal displays of comparative examples 1 to 3. Thus, the reflection-type liquid crystal displays of exemplary embodiments 1 to 4 exhibited improved moisture barrier properties. When an image was projected by a liquid crystal projector using each of the reflection-type liquid crystal displays of exemplary embodiments 1 to 4, the image projected by the liquid crystal projector was of better quality with less image retention than an image projected by any one of liquid crystal projectors using the reflection-type liquid crystal displays of comparative examples 1 to 3.

With respect to the reflection-type liquid crystal display manufactured in comparative example 3, the cell gap and the gap evenness are deteriorate after the sintering process at 250° C. For this reason, display unevenness is likely. Also, since the reflection-type liquid crystal display of comparative example 3 allows impurity ions to increase, image retention is likely to occur in a short time. Therefore, the use of the reflection-type liquid crystal display of comparative example 3 cannot provide for a liquid crystal projector of good quality.

As described above, the present invention can provide a reflection-type liquid crystal display of the LCOS type which is capable of suppressing penetration of moisture. Therefore, the present invention can suppress deterioration in the display properties of a liquid crystal projector caused by penetration of moisture into the liquid crystal display.

The above-described moisture penetration suppressing technique using the inorganic film 16 or the like is applicable to a liquid crystal display at an ordinary temperature. For this reason, the liquid crystal display can be provided with a moisture-penetration suppressing unit without deterioration of any structural resin material. Particularly where the image display apparatus is of the reflection type, impurities produced from such a structural resin material form a main cause of image retention. The moisture-penetration suppressing technique applied at an ordinary temperature is particularly effective for such an arrangement.

The moisture-penetration suppressing technique according to the present invention can be applied to a liquid crystal display in a simple and convenient way. For this reason, a conventional liquid crystal display manufacturing process can be utilized with less influence upon the productivity thereof.

By removing moisture taken in during the liquid crystal panel assembly process before providing the liquid crystal display with the moisture-penetration suppressing unit, the effect of the moisture-penetration suppressing unit becomes more noticeable. Further, the moisture-penetration suppressing technique according to the present invention does not bring about any change to the outward appearance structure of the liquid crystal display. Therefore, the provision of the moisture-penetration suppressing unit allows little change to occur in the dimensions of the liquid crystal display. Where the image display apparatus is of the projection type, the liquid crystal display provided with the moisture-penetration unit is a particularly advantageous arrangement in terms of layout space. The present invention is particularly effective for such an arrangement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-319706, filed Dec. 11, 2007, which is hereby incorporated by reference herein in its entirety.

What is claimed is:

1. A method of manufacturing a display apparatus comprising:
   a first step of bonding together a pair of substrates with a first sealing member arranged at an outer periphery of a pair of substrates; and
   a second step of irradiating, with ultraviolet radiation, an alkylsiloxane compound which is at a state of an alkylsiloxane structure at a temperature lower than a glass transition temperature of the first sealing member, and which is arranged at an outer periphery of the first sealing member in contact with the pair of substrates, to form a second sealing member that is an inorganic film.

2. The method according to claim 1, wherein the alkylsiloxane compound is a di-alkylsiloxane compound, or di-methyl-siloxane compound.

3. The method according to claim 1, wherein the alkylsiloxane compound is a di-methyl-silicone.

4. The method according to claim 1, wherein the inorganic film is silicon oxide.

5. A method of manufacturing a display apparatus comprising:
   bonding together a pair of substrates with a first sealing member arranged at an outer periphery of a pair of substrates;
   disposing a member for sealing at an outer periphery of the first sealing member; and
   irradiating the member for sealing with ultraviolet radiation,
   wherein the member for sealing is an alkylsiloxane compound, which has an alkylsiloxane structure at a temperature lower than a glass transition temperature of the first sealing member.

6. The method according to claim 5, wherein the member for sealing is disposed so as to be in contact with the first sealing member.

7. The method according to claim 5, wherein the step of disposing a member for sealing is performed after thermally treating the first sealing member.

8. The method according to claim 7, wherein the step of thermally treating the first sealing member reduces moisture included in the first sealing member.

9. The method according to claim 5, wherein the member for sealing is formed into an inorganic sealing member including silicon oxide by irradiation with the ultraviolet radiation.

10. The method according to claim 9, wherein the step of irradiating the member for sealing with ultraviolet radiation is performed so as to suppress irradiation of a display area of the display apparatus with the ultraviolet radiation.

11. The method according to claim 10, wherein the step of irradiating the member for sealing with ultraviolet radiation is performed while the display area is covered with a mask for suppressing the irradiation by the ultraviolet radiation.

* * * * *